(12) United States Patent
Krais et al.

(10) Patent No.: US 11,177,709 B2
(45) Date of Patent: Nov. 16, 2021

(54) ROTOR ASSEMBLY FOR AN ELECTRIC MACHINE, ELECTRIC MACHINE FOR A VEHICLE, AND VEHICLE

(71) Applicant: VALEO SIEMENS EAUTOMOTIVE GERMANY GMBH, Erlangen (DE)

(72) Inventors: Nils Krais, Strahlungen (DE); Philipp Söntgerath, Niederkrüchten (DE); Sebastian Waider, Petersberg (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 0 days.

(21) Appl. No.: 16/522,925

(22) Filed: Jul. 26, 2019

(65) Prior Publication Data
US 2020/0036250 A1    Jan. 30, 2020

(30) Foreign Application Priority Data

Jul. 27, 2018 (DE) ...................... 10 2018 118 276.7

(51) Int. Cl.
*H02K 1/32* (2006.01)
*H02K 7/00* (2006.01)
*H02K 1/30* (2006.01)
*H02K 1/27* (2006.01)

(52) U.S. Cl.
CPC ............. *H02K 1/32* (2013.01); *H02K 1/276* (2013.01); *H02K 1/30* (2013.01); *H02K 7/006* (2013.01)

(58) Field of Classification Search
USPC .................................................. 310/52–64
See application file for complete search history.

(56) References Cited

U.S. PATENT DOCUMENTS

| | | | |
|---|---|---|---|
| 3,145,314 A | | 8/1964 | Becker |
| 3,800,174 A | * | 3/1974 | Butterfield ............... H02K 9/19 |
| | | | 310/61 |
| 4,692,644 A | * | 9/1987 | Lenz ........................ H02K 9/19 |
| | | | 228/193 |
| 2004/0080218 A1 | | 4/2004 | Weidman et al. |
| 2010/0164310 A1 | * | 7/2010 | Dames ..................... H02K 1/32 |
| | | | 310/54 |
| 2015/0280525 A1 | | 10/2015 | Rippel et al. |
| 2015/0288255 A1 | * | 10/2015 | Barker .................. H02K 9/197 |
| | | | 310/43 |
| 2019/0181709 A1 | * | 6/2019 | Berendes ................. H02K 1/32 |

FOREIGN PATENT DOCUMENTS

| | | |
|---|---|---|
| DE | 102011121042 A1 | 6/2012 |
| GB | 2501952 A | 11/2013 |

* cited by examiner

*Primary Examiner* — Quyen P Leung
*Assistant Examiner* — Minki Chang
(74) *Attorney, Agent, or Firm* — Manabu Kanesaka

(57) ABSTRACT

A rotor assembly for an electric machine, including a rotor core and a shaft, is connected to the rotor core for conjoint rotation, wherein a cooling channel arrangement is formed within the rotor assembly and includes a cooling channel, which extends within the shaft. The rotor assembly further includes a separation element which has a separation portion extending in the circumferential direction at an inner radius of the shaft, wherein the separation portion separates an interior of the shaft into a first shaft portion, in which the cooling channel extends, and into a second shaft portion, wherein the separation element includes a sealing device, which seals off the shaft portions with respect to one another.

16 Claims, 5 Drawing Sheets

Figure 1:
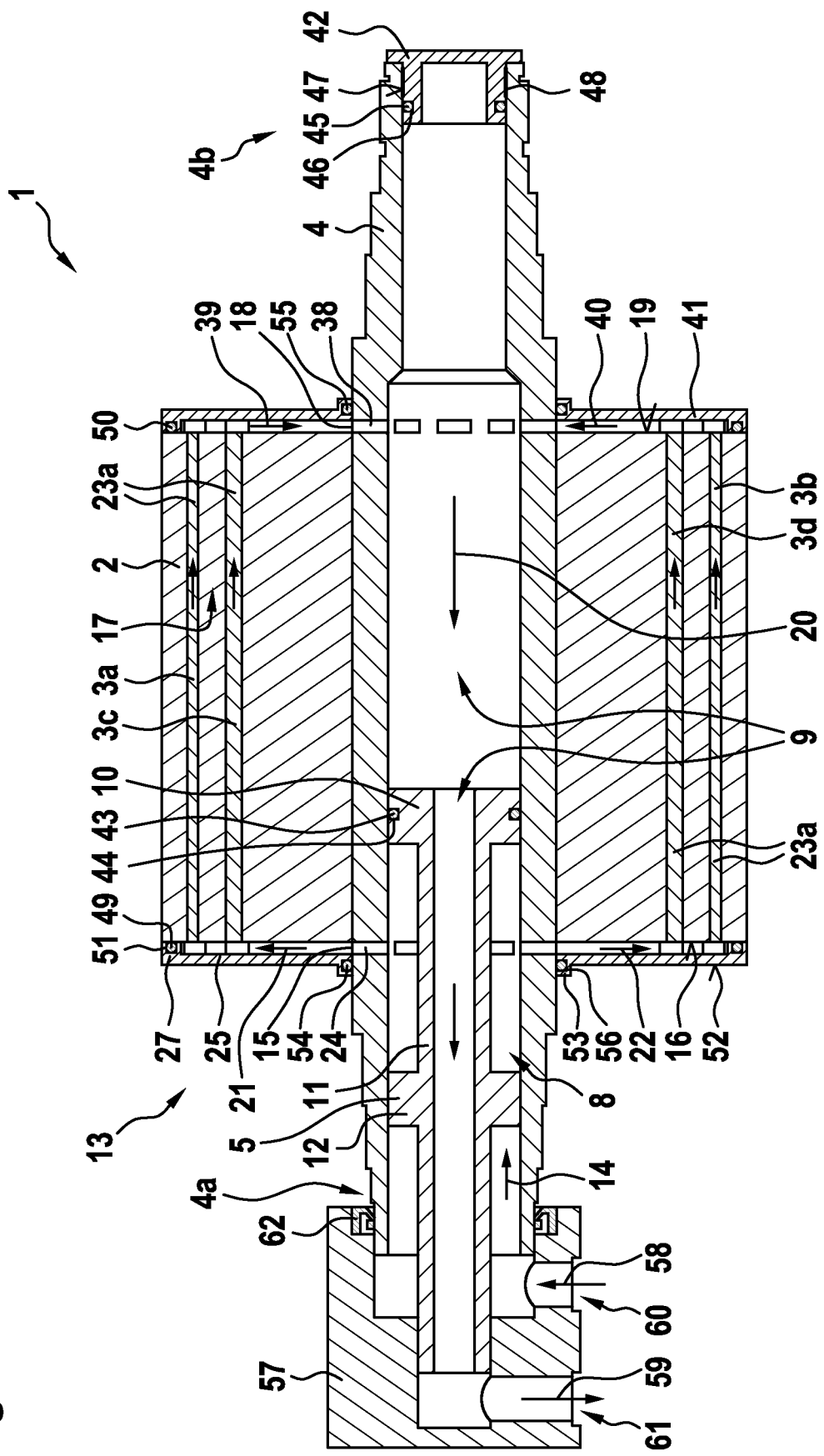

ROTOR ASSEMBLY FOR AN ELECTRIC MACHINE, ELECTRIC MACHINE FOR A VEHICLE, AND VEHICLE

RELATED APPLICATIONS

The present application is based on, and claims priority from, German Application No. 10 2018 118 276.7 filed Jul. 27, 2018, the disclosure of which is hereby incorporated by reference herein in its entirety.

The present invention relates to a rotor assembly for an electric machine, comprising a rotor core and a shaft, which is connected to the rotor core for conjoint rotation, wherein a cooling channel arrangement is formed within the rotor assembly and comprises a cooling channel, which extends within the shaft.

The invention also relates to an electric machine for a vehicle, and to a vehicle.

During the operation of electric machines, iron losses occur if magnetic alternating fields are produced. The iron losses produce heat in a rotor core and heat up permanent magnets arranged there, wherein a demagnetisation temperature of the permanent magnets must not be exceeded. In order to improve the performance of the electric machine it is known to dissipate the heat away from the permanent magnets. In the case of electric machines with a high utilisation, as can be used in electrically driveable vehicles, this can be achieved by the cooling of a shaft connected to the rotor core for conjoint rotation.

Document DE 10 2011 121 042 A1 discloses a cooling assembly for an electric machine with a rotor with a plurality of permanent magnets, which are arranged in a magnet pocket each. A plurality of axially running first cooling channels is arranged on an inner circumference of a rotor core and at least one passage opening between an interior of the rotor and a first cooling channel is arranged in a rotor carrier, wherein an oil-guiding ring is arranged at each end of the rotor core, in which oil-guiding ring there are arranged channels for fluidic coupling of a first cooling channel and magnet pocket or end-face openings of the magnet pocket.

The object of the invention consequently is to describe a possibility for the robust operation of an electric machine cooled via a rotor assembly.

This object is achieved in accordance with the invention by a rotor assembly of the kind described at the outset, further comprising a separation element which has a separation portion extending in the circumferential direction at an inner radius of the shaft, wherein the separation portion separates an interior of the shaft into a first shaft portion, in which the cooling channel extends, and into a second shaft portion, wherein the separation element comprises a sealing means, which seals off the shaft portions with respect to one another.

The present invention proceeds from the consideration of separating the interior of the shaft into two shaft portions and sealing these fluid-tight with respect to one another by the sealing means. An undesirable discharge of a cooling fluid can thus be prevented, which advantageously enables a more robust operation of the electric machine.

The cooling channels are preferably designed to guide a liquid cooling fluid, for example oil, water or a glycol-water mixture. However, it is also conceivable that the cooling channels are designed to guide a gaseous cooling fluid.

It is particularly preferred in the rotor assembly according to the invention if the sealing means is an O-ring. The separation portion expediently has a groove which extends in the circumferential direction and into which the O-ring is inserted.

In order to prevent the cooling fluid from escaping from the shaft it is also advantageous if the separation element has an end portion, which is arranged protruding into the interior of the shaft at a free end, wherein at least one further sealing means is provided, which seals off the end portion and the shaft with respect to one another.

In the rotor assembly according to the invention a termination element can also be provided, which seals off the second shaft portion fluid-tight at a free end opposite the first shaft portion, wherein at least one further sealing means can be provided, which seals off the termination element and the shaft with respect to one another.

A sealing means sealing off the end portion or the termination element can be an O-ring. Alternatively or additionally, the sealing means is an adhesive layer arranged on a surface of the end portion or of the termination element. The surface is particularly preferably roughened. The surface is typically the lateral surface of a substantially cylindrical part of the end portion or the termination element.

In accordance with a preferred embodiment of the rotor assembly according to the invention the cooling channel arrangement extends through the rotor core into the second shaft portion. The sealing means of the separation element then allows a particularly advantageous seal of the shaft portions through which fluid passes, if a cooling path guided back into the shaft through the cooling channel arrangement is to be formed.

The rotor assembly according to the invention for example comprises an end plate, which is arranged on an end face of the rotor core and which, at least in some sections, forms a second cooling channel of the cooling channel arrangement, which second cooling channel adjoins the first cooling channel. Furthermore, the second cooling channel can be adjoined by a third cooling channel of the cooling channel arrangement, which third cooling channel extends through the rotor core. A particularly favourable dissipation of heat from the rotor core is thus made possible.

It is particularly preferably provided that a fourth cooling channel of the cooling channel arrangement adjoins the third cooling channel and is formed at least in part by a further end plate arranged on the rotor core and leads into the second shaft portion. Conventional rotor cores advantageously can be easily retrofitted with end plates of this kind.

The end plate or one end plate can be sealed off with respect to the rotor core by means of a further sealing means. The further sealing means is preferably arranged in a collar, which is situated in an outer radial position on the side of the end plate facing the rotor core. Expediently, a groove is formed in the collar and receives further sealing means. The further sealing means sealing off the end plate with respect to the rotor core can be an O-ring.

It is additionally advantageous if the end plate or one end plate is sealed off with respect to the shaft by means of a further sealing means. To this end, the end plate, on its end face facing away from the rotor core, can have a bead surrounding the shaft, with the further sealing means being received in said bead. A groove is typically formed in the bead and receives the further sealing means. The further sealing means sealing off the end plate with respect to the shaft can be an O-ring.

In order to prevent the cooling fluid from escaping from the rotor core, it can be provided advantageously that a lamination stack of the rotor core has an outer sealing layer or a plurality of outer sealing layers formed one on the other, made of a resin material. A liquid barrier is formed by the outer sealing layer and closes off any potential leaks between the laminations. Two outer sealing layers are preferably provided. The sealing layers can be formed by immersing the lamination stack into the resin material once or a number of times.

In respect of a realisation of the rotor assembly according to the invention for a permanently excited electric machine, it is preferred if the rotor assembly has a plurality of permanent magnets, which extend within a magnet pocket each, formed in the rotor core, so as to form a clearance extending in the axial direction. The cooling channel arrangement, in particular the third cooling channel, preferably extends through the clearances. The permanent magnets are thus cooled directly, so that the risk of demagnetisation is reduced, even in the event of full-load operation of the electric machine, and a high power density of the electric machine is attained. Due to the efficient cooling, the use of more economical permanent magnets with a low demagnetisation temperature with the same utilisation of the machine is also made possible. The permanent magnets advantageously can be free from rare earths, since the cooling strategy provided with the rotor assembly according to the invention eradicates the need for permanent magnets of this kind suitable for high temperatures.

The separation element of the rotor assembly according to the invention preferably has a fluid-guiding portion, which extends through the first shaft portion as far as an axial position between the end faces of the rotor core and partially forms the second shaft portion. The second shaft portion consequently can comprise the interior of the shaft as far as the axial position and the portion of the shaft delimited by an inner wall of the fluid-guiding portion. The first shaft portion can comprise the portion of the shaft delimited by the separation portion and the portion of the shaft delimited by an outer wall of the fluid-guiding portion. The fluid-guiding portion is expediently arranged coaxially with respect to the shaft. The fluid-guiding portion typically leads into the separation element. The fluid-guiding portion is generally formed by a pipe.

In the rotor assembly according to the invention there is particularly preferably also provided a connection element, relative to which the shaft is rotatable, wherein a free end of the shaft associated with the first shaft portion leads into the connection element and is fluidically connected to a feed channel of the connection element. A particularly simple end-side feed of the first shaft portion is thus realised. The connection element typically has a radial shaft ring seal, in which the shaft is rotatable.

The fluid-guiding portion particularly preferably leads into the connection element and is fluidically connected to a further feed channel. The connection element consequently provides both a feed and a return for the cooling fluid and thus makes it possible to provide a particularly simple feed of the shaft at just one free end.

The feed channel or the feed channels can run in the radial direction. The axial extent of the rotor assembly is thus prevented from being extended by a fluid line that is connected to a feed channel, thus enabling a space-saving design of the rotor assembly. The connection element expediently comprises at least one cooling fluid connection on its lateral surface, which cooling fluid connection is fluidically connected to the feed channel or one feed channel.

In accordance with an alternative embodiment of the rotor assembly according to the invention, the first cooling channel extends between a free end of the shaft and the second cooling channel, wherein a fifth cooling channel adjoining the fourth cooling channel extends to the other free end of the shaft. In this way, the cooling fluid can be supplied at one free end and can be discharged at another free end of the shaft. The separation portion of the separation element then advantageously seals off the shaft fully at an axial position between the end faces. In this embodiment as well a fluid-guiding element can be provided which typically has through-holes so that a fluidic connection of the first cooling channel to the second cooling channel is formed.

With regard to the rotor core of the rotor assembly according to the invention it is preferred if a plurality of magnet pocket arrangements are each formed from a plurality of the magnet pockets, the clearances thereof forming a cooling channel portion each of the third cooling channel. This makes possible an improved cooling of the rotor assembly, in which the third cooling channel is divided into the plurality of cooling portions.

The second cooling channel can have a plurality of cooling channel portions which are separated from one another and which are adjoined by one of the cooling channel portions each of the third cooling channel. Alternatively or additionally, the fourth cooling channel can have a plurality of cooling channel portions which are separated from one another and which are adjoined by one of the cooling channel portions each of the third cooling channel. In other words, for each cooling channel portion of the third cooling channel extending in the axial direction, a cooling channel portion of the second or fourth cooling channel is provided and is connected to said cooling channel portion of the third cooling channel, such that a targeted feed or discharge of the cooling fluid in respect of the third cooling channel is made possible.

It is also preferred if each magnet pocket arrangement comprises two radially mutually distanced pairs of magnet pockets arranged in a V shape. Rotor assemblies with what are known as "double V" permanent magnets can thus also be cooled efficiently.

It is expediently provided in the rotor assembly according to the invention that each magnet pocket forms a further clearance within the magnet pocket, wherein the third cooling channel also extends through the further clearance. In other words, a permanent magnet separates the two clearances formed within a magnet pocket. This enables a particularly uniform cooling of the permanent magnets.

It is also provided preferably in the case of the rotor assembly according to the invention that the second cooling channel is designed for connection to the first cooling channel in part by through-holes penetrating the shaft. Alternatively or additionally, the fourth cooling channel can be designed for connection to the second shaft portion in part by through-holes penetrating the shaft. Conventional rotor assemblies can thus advantageously be retrofitted with little effort and without a cooling of the permanent magnets, by merely forming additional through-holes at appropriate axial positions of the shaft. A through-hole is typically provided in the shaft for each cooling channel portion of the second or fourth cooling channel.

In addition, in the rotor assembly according to the invention the second cooling channel can be designed for connection to the third cooling channel in part by elevations in the end plate. Alternatively or additionally, the fourth cooling channel can be designed for connection to the third cooling channel in part by elevations in the end plate. The second cooling channel and the fourth cooling channel are consequently delimited on the one hand by the end plate with its elevations and on the other hand by an end face of the rotor core.

The end plate can have a central through-opening for guiding through the shaft. The collar can be formed radially outwardly in the circumferential direction, wherein the elevations and the collar axially delimit the second and fourth cooling channel, wherein the cooling channel portions of the cooling channel are delimited by an elevation at each of the two ends, wherein two elevations delimiting a cooling channel portion are distanced from one another by a first arc length in a first radial position between the through-opening and the collar and are distanced from one another by a second arc length, which is greater than the first arc length, in a second radial position delimited by collars. Each cooling channel portion typically extends as far as the through-opening.

A cooling channel portion advantageously has at least one fluid-guiding element between the first radial portion and second radial portion. A fluidically improved distribution of the cooling fluid within the magnet pockets thus can be achieved within the magnet pockets, which makes possible a greater cooling performance of the electric machine. At the same time, an inhibition, in particular a prevention, of the axial movement of the permanent magnet can be achieved by the at least one fluid-guiding element without additional structural elements, which results in a greater mechanical stability of the rotor assembly.

For example, a fluid-guiding element can be provided which is formed by a protuberance of an elevation. The fluid-guiding element, which is also referred to hereinafter as a first fluid-guiding element, consequently provides a bulging that narrows the cooling channel portion. The first fluid-guiding element is used preferably to support a permanent magnet, in particular a radially inner permanent magnet.

It is also advantageous if a fluid-guiding element is provided which is formed by a free elevation that has the same extent in two orthogonal directions of a plane perpendicular to the axial direction. Such a fluid-guiding element, also referred to hereinafter as a second fluid-guiding element, is used expediently to support a radially outer permanent magnet. The free elevation is preferably circular.

The (first) fluid-guiding element formed by the protrusion is particularly preferably arranged radially further inwardly than the (second) fluid-guiding element formed by the free elevation. A partial cooling channel is thus formed between the first and the second fluid-guiding element and guides the cooling fluid to radially outer clearances of the magnet pockets.

A fluid-guiding element can also be provided which is formed by a free elevation which extends in an elongate manner in the radial direction. Such a fluid-guiding element, also referred to as a third fluid-guiding element, is used typically primarily in order to fluidically optimise the cooling channel.

A further fluid-guiding element symmetrical with respect to a plane extending in the radial direction through the middle of the cooling channel portion is particularly preferably provided in addition to the fluid-guiding element or one fluid-guiding element. In particular, the third fluid-guiding elements are mutually distanced radially inwardly not further than the first arc length and/or are mutually distanced radially outwardly further than radially inwardly. The third fluid-guiding elements thus form a partial cooling channel, in order to guide the cooling fluid to the inner clearances of the radially outer permanent magnets.

In addition, a fluid-guiding element can be provided that is formed as a protrusion pointing centrally from the collar into the cooling channel portion. This optimises the cooling fluid flow between the radially outer permanent magnets.

The cooling channel portions particularly preferably continue from the first radial position in a straight line to the through-opening. A fluidically advantageous cross-section of the cooling channel portions between the through-opening and the first radial position can thus be specified.

In addition, the invention relates to an electric machine comprising a stator and a rotor assembly according to the invention arranged within the stator.

The invention additionally relates to a vehicle comprising an electric machine according to the invention which is designed to drive the vehicle.

All details regarding the rotor assembly according to the invention can be transferred analogously to the electric machine according to the invention and the vehicle according to the invention, such that the above-mentioned advantages can be attained with these as well.

Figure 2:
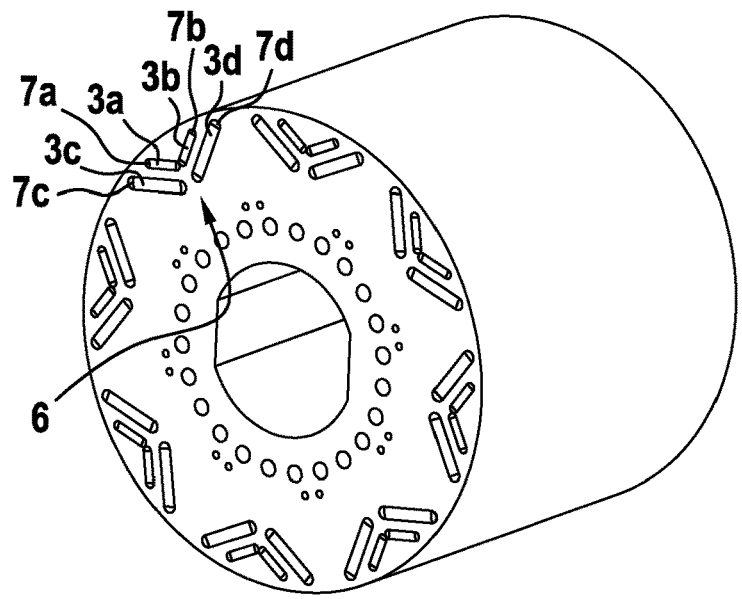
Figure 3:
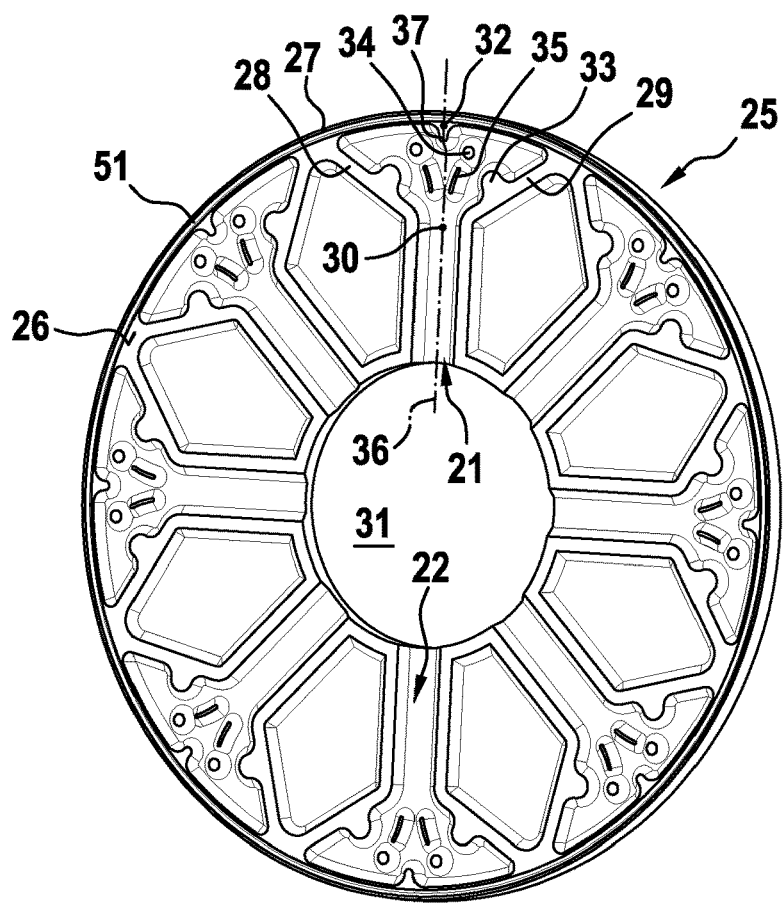
Figure 4:
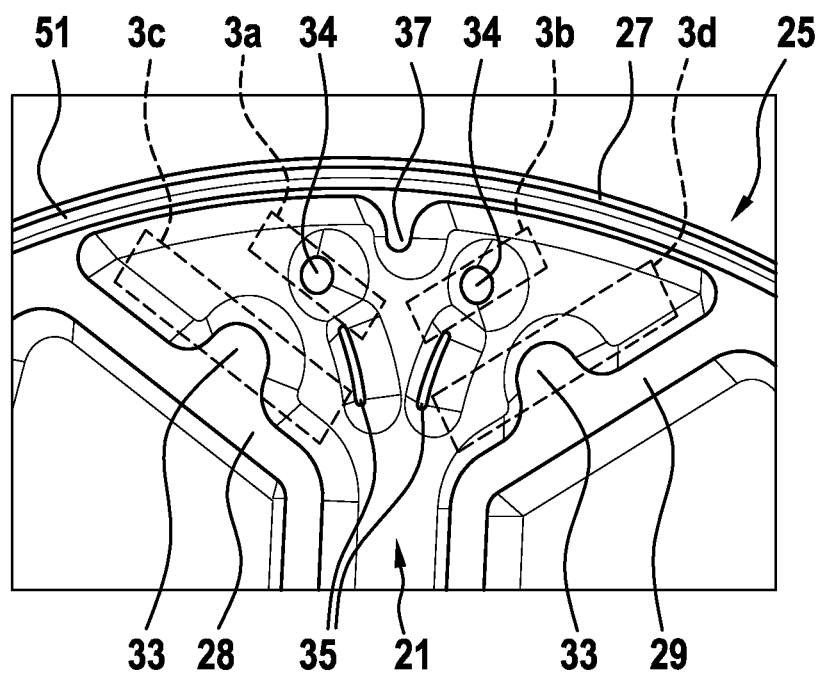
Figure 5:
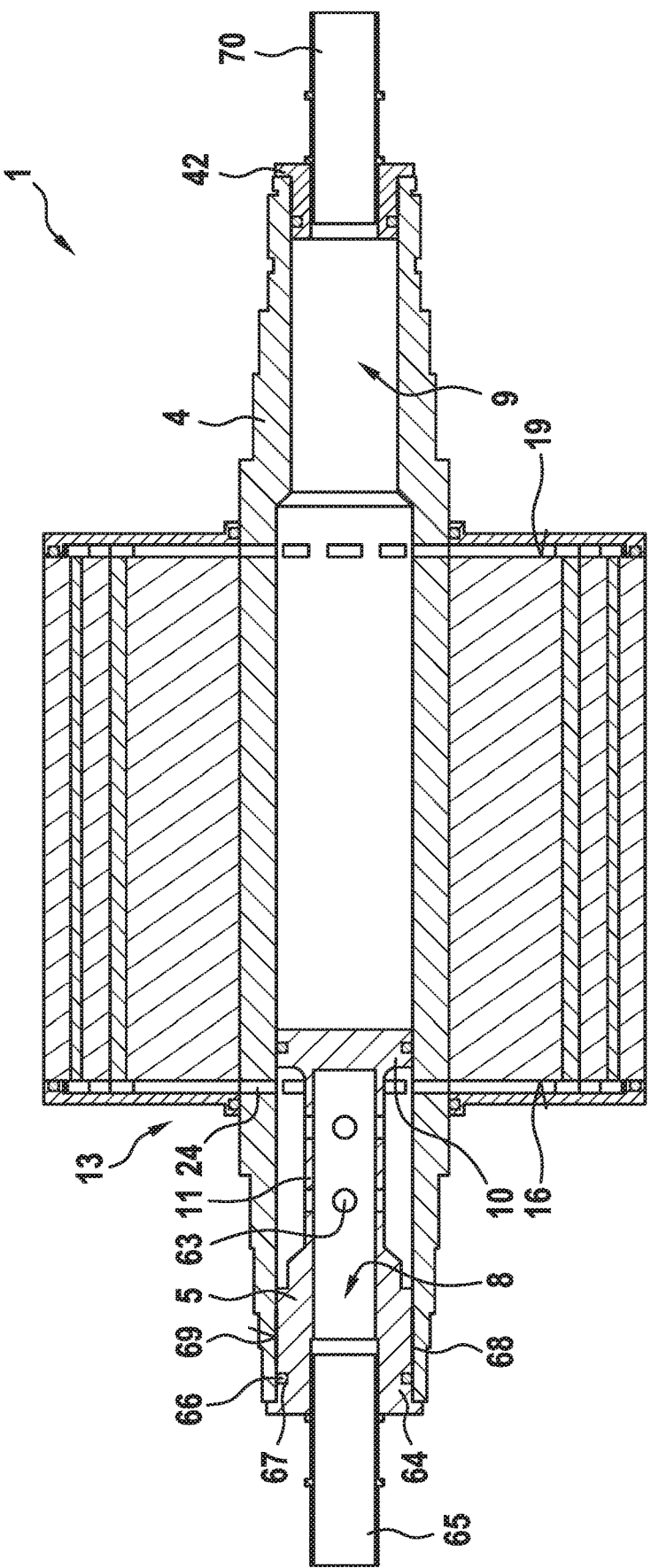
Figure 6:
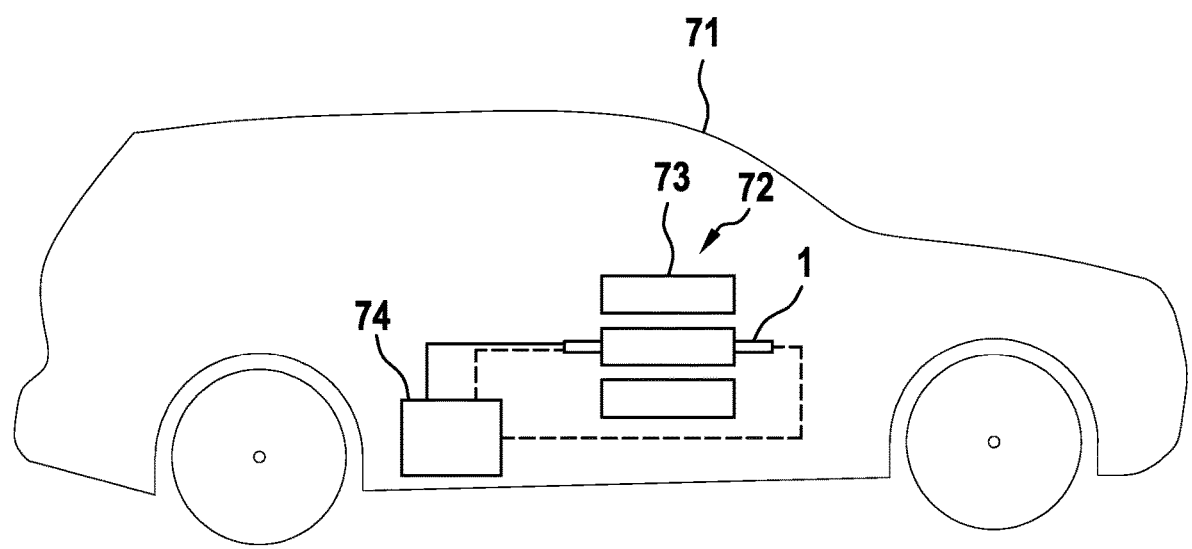

Further advantages and details of the invention will become clear from the exemplary embodiments described hereinafter and also with reference to the drawings. These are schematic depictions and show:

FIG. 1 a sectional view of a first exemplary embodiment of the rotor assembly according to the invention;

FIG. 2 a perspective view of a rotor core with permanent magnets of the rotor assembly shown in FIG. 1 received in said rotor core;

FIG. 3 a perspective depiction of an end plate of the rotor assembly shown in FIG. 1;

FIG. 4 a detailed depiction of the end plate shown in FIG. 3;

FIG. 5 a sectional depiction of a further exemplary embodiment of the rotor assembly according to the invention; and FIG. 6 a schematic sketch of an exemplary embodiment of the vehicle according to the invention with an exemplary embodiment of the electric machine according to the invention.

FIG. 1 is a sectional view of a first exemplary embodiment of a rotor assembly 1, comprising a rotor core 2, a plurality of permanent magnets 3a-3d, a shaft 4, which is connected to the rotor core 2 for conjoint rotation, and a separation element 5.

FIG. 2 is a perspective depiction of the rotor core 2 with the permanent magnets 3a-3d received therein. The rotor core 2 is formed as a lamination stack formed from multiple laminated individual sheets. Multiple magnet pocket arrangements, in the present case numbering eight in total and arranged at a distance in each case of 45°, are formed within the rotor core.

Each magnet pocket arrangement 6 comprises a pair of magnet pockets 7a, 7b, in which the permanent magnets 3a, 3b are received, and a pair of magnet pockets 7c, 7d, in which the permanent magnets 3c, 3d are received. The magnet pocket arrangement 6 here forms what is known as a "double V" arrangement, in which each pair is arranged in a V shape, wherein the pair of magnet pockets 7a, 7b is arranged radially further outwardly than the pair of magnet pockets 7c, 7d. Clearances extending in the axial direction are formed within the magnet pockets 7a-7d, on each of the two sides of each of the permanent magnets 3a-3d.

It can be clearly seen from FIG. 1 that the separation element 5 separates the shaft into a first shaft portion 8 and into a second shaft portion 9. To this end, the separation element 5 has a separation portion 10, which extends in the circumferential direction along an inner radius of the shaft 4. A fluid-guiding portion 11 of the separation element 5 leads into the separation portion 10, is tubular, and extends from an axial position between two end faces 16, 19 of the rotor core 2 beyond a free end 4a of the shaft 4. The fluid-guiding portion 11 consequently extends through the first shaft portion 8 and continues into and through the second shaft portion 9. In addition, the separation element 5 comprises a support portion 12, which is arranged on the fluid-guiding portion 11 between the free end and the separation portion 10 and supports the separation element 5 in the first shaft portion 8 in such a way that a cooling fluid can flow past the support portion 12 through the first shaft portion 8.

A cooling channel arrangement 13 is formed inside the rotor assembly 1. This cooling channel arrangement comprises a first cooling channel 14, which extends inside the shaft along the first shaft portion 8 in the axial direction. A second cooling channel 15 of the cooling channel arrangement 13 extends in the radial direction along the end face 16 of the rotor core 2 and directly adjoins the first cooling channel 14. In addition, a third cooling channel 17 is provided, which, adjoining the second cooling channel, extends in the axial direction through the clearances into the magnet pockets 7a-7d. A fourth cooling channel 18 of the cooling channel arrangement adjoining the third cooling channel 17 extends in the radial direction along the other end face 19 of the rotor core 2 and leads into the second shaft portion 9, which forms a fifth cooling channel 20. Consequently, a cooling path (denoted by arrows in FIG. 1) for the cooling fluid is thus formed and extends from the free end 4a of the shaft 4 through the first shaft portion 8, the rotor core 2, and the second shaft portion 9 back to the free end 4a of the shaft 4.

The second cooling channel 15 has a plurality of mutually separated cooling channel portions 21, 22, adjoined in each case by a cooling channel portion 23a, 23b of the third cooling channel 17. Each cooling channel portion 23a, 23b of the third cooling channel 17 is formed here from the clearances of a magnet pocket arrangement 6. In other words, each cooling channel portion 23a, 23b is divided eight times by the clearances.

The second cooling channel 15 is formed here in a radially inner part by through-holes 24 within the shaft 4. A through-hole 24 for each cooling channel portion 21, 22 is provided in the shaft 4. A radially outer part of the second cooling channel 15 adjoining the radially inner part is delimited by the end face 16 of the rotor core 2 and by an end plate 25 of the rotor assembly 1.

FIG. 3 is a perspective depiction of the end plate 25 with a view of an end face 26 facing the end face 16 of the rotor core 2. A collar 27 is formed radially outwardly in the circumferential direction on the end face 26. In addition, a plurality of elevations 28, 29 are formed on the end face 26 and delimit the second cooling channel 15. Each cooling channel portion 21, 22 of the second cooling channel 15 is delimited by a pair of adjacent elevations 28, 29. All cooling channel portions 21, 22 are structured identically, and therefore they are described hereinafter on the basis of the cooling channel portion 21:

The elevations 28, 29 are distanced from one another by a first arc length in a first radial position marked by a point 30. The first radial position is situated between a through-opening 31 of the end plate 25 and the collar 27, which defines a second radial position marked by a point 32. In the second radial position the elevations 28, 29 are distanced from one another by a second arc length, which is greater than the first arc length. The elevations 28, 29 thus form a substantially V-shaped part of the cooling channel portion 21, which corresponds to the arrangement of the magnet pockets 7a-7d of one of the magnet pocket arrangements 6. From the first radial position, the cooling channel portion 21 continues in a straight line as far as the through-opening 31, where the elevations 28, 29 adjoin one of the through-holes 24 (see FIG. 1).

Pairs of first fluid-guiding elements 33, second fluid-guiding elements 34 and third fluid-guiding elements 35 are provided within each cooling channel portion 21, 22 and are symmetrical with respect to a plane 36 extending in the radial direction through the middle of the cooling channel portion 21. A fourth fluid-guiding element 37 is additionally provided.

FIG. 4 is a detailed depiction of the end plate 25 with projections (shown by dashed lines) of the positions of the permanent magnets 3a-3d.

The first fluid-guiding elements 33 are each formed as a protrusion of one of the elevations 28, 29 and support the radially inner pair of permanent magnets 3c, 3d. The second fluid-guiding elements 34 are formed as circular free elevations within the cooling channel portion 21 and support the radially outer pair of permanent magnets 3a, 3b. A movement of the permanent magnets 3a-3d out from the magnet pockets 7a-7b (see FIG. 2) is thus prevented. The first fluid-guiding elements 33 are accordingly arranged radially further inwardly than the second fluid-guiding elements 34. The first fluid-guiding element 33 and the second fluid-guiding element 34 on one side of the plane 36 also form a partial cooling channel portion, which improves the flow cross-section of the cooling fluid flowing into the radially outer clearances of the magnet pockets 7a-7d (see FIG. 2).

The third fluid-guiding elements 35 are likewise formed as free elevations and extend arcuately in the radial direction. The third fluid-guiding elements 35 are radially inwardly distanced from one another by less than the first arc length and radially outwardly are distanced from one another further than radially inwardly. The third fluid-guiding elements 35 are likewise used to improve the flow cross-section for the cooling fluid flowing into the radially inner clearances of the radially outer magnet pockets 7a, 7b (see FIG. 2).

The fourth fluid-guiding element 37 is formed as a protrusion pointing centrally from the collar 27 into the cooling channel portion 21 and optimises the flow cross-section for the cooling fluid flowing into the radially outer clearances of the radially outer magnet pockets 7a, 7b.

As can be seen in FIG. 1, a radially inner part of the fourth cooling channel 18 is also formed in some sections by through-holes 38 in the shaft 4, which are arranged in an axial position corresponding to the end face 19 of the rotor core 2. As is the case with the second cooling channel 15, a radially outer part of each of the cooling channel portions 39, 40 is also delimited by the end face 19 and an end plate 41 arranged thereon. The structure of the end plate 41 corresponds to the previously described structure of the end plate 25, and therefore the cooling channel portions 39, 40 are formed similarly to the cooling channel portion 21, 22 of the second cooling channel 15.

At a free end 4b of the shaft 4 opposite the separation element 5, the rotor assembly 1 has a termination element 42 in the form of a blind stopper, which axially delimits the second shaft portion 9.

In addition, the rotor assembly 1 has multiple sealing means, which prevents the cooling fluid from escaping from the cooling channel arrangement 13:

The separation element 5 comprises a first sealing means 43, which is arranged in a radial groove 44 formed on the separation portion 10 and running in the circumferential direction and seals off the shaft portions 8, 9 with respect to one another. The first sealing means 43 is an O-ring.

A second sealing means 45 in the form of an O-ring is provided within a radial groove 46 of the termination element 42, said groove running in the circumferential direction. In addition, a surface 47 of the termination element 42 extending in the circumferential direction is roughened and is provided with a third sealing means 48 in the form of an adhesive layer, such that the second sealing means 45 and the third sealing means 48 seal off the termination element 42 with respect to the shaft 4.

The end plates 25, 41 are sealed off with respect to the rotor core 2 by means of a fourth sealing means 49 and a fifth sealing means 50, which are arranged in each case in an axial groove 51, which is formed in the collar 27 and runs in the circumferential direction. The end plates 25, 40 additionally have, on their end face 52 opposite the rotor core 2, a bead 53 formed in the circumferential direction around the through-opening 31 (see FIG. 3), in which bead there is arranged a sixth sealing means 54 or a seventh sealing means 55 within a radial groove 56 running in the circumferential direction.

In order to further seal off the rotor core 2, said core has two outer sealing layers (not shown), which are formed by immersing the rotor core twice into a liquid resin material, without the permanent magnets 3a-3d received in the core.

The rotor assembly 1 additionally has a connection element 57, relative to which the shaft 4 is rotatable. The free end 4a of the shaft 4 associated with the first shaft portion 8 leads into the connection element 57 and is fluidically connected to a first feed channel 58 of the termination element 57. In addition, the fluid-guiding portion 11 also leads into the connection element 57 at the free end 4a and is fluidically connected to a second feed channel 59. The feed channels 58, 59 run in a manner axially distanced from one another in the radial direction and lead into a lateral surface of the substantially cylindrical connection element 57. The connection element 57 additionally has cooling fluid connections 60, 61 arranged on its lateral surface, for example in order to connect fluid lines, which feed and discharge the cooling fluid, to the feed channels 58, 59. The connection element 57 additionally has a radial shaft ring seal 62, in which the shaft 4 can rotate.

It is shown merely by way of example in FIG. 1 that the cooling fluid passes through the first feed channel 58 into the first shaft portion 8, flows through the first cooling channel 14, the second cooling channel 15, the third cooling channel 17, the fourth cooling channel 18 and the fifth cooling channel 20, and flows back into the second feed channel 59 of the connection element 57. It is also possible that the cooling fluid flow is provided in the reverse direction.

FIG. 5 shows a sectional depiction of a further exemplary embodiment of a rotor assembly 1, which corresponds to the rotor assembly shown in FIG. 1 apart from the deviations described hereinafter. Here, identical or equivalent components of the exemplary embodiments are provided with identical reference signs. The rotor assembly 1 according to FIG. 5 differs primarily in that the cooling fluid can be guided into and out from the shaft 4 at different free ends 4a, 4b thereof.

To this end, the separation portion 10 of the separation element 5 is formed in such a way that it fully separates the shaft 4 at an axial position between the end faces 16, 19. In other words, the second shaft portion 9 does not extend through the first shaft portion 8. The fluid-guiding portion 11 is also fully delimited axially by the separation portion 10. The fluid-guiding portion 11 additionally has a plurality of through-holes 63, so that the cooling fluid can escape from the fluid-guiding portion 11 and can pass to the through-holes 24.

At the free end 4a of the shaft 4, the separation element 5 has an end portion 64, which protrudes into the free end 4a. The fluid-guiding portion 11 leads into the end portion 64, so that the cooling fluid can pass through a cylindrical feed element 65 into the first shaft portion 8. The end portion 64 is sealed off similarly to the termination element 42 by a sealing means 66 in the form of an O-ring, which is arranged in a radial groove 67 running in the circumferential direction, and is sealed off by means of a sealing means 68 in the form of an adhesive layer arranged on a roughened surface 69 of the end portion 64.

In this exemplary embodiment, the termination element 42 is not formed as a blind stopper, but instead has a passage for a further feed element 70, in order to guide the cooling fluid out from the second shaft portion 9 after said cooling fluid has been introduced into the fluid-guiding portion 11 and has passed through the cooling channel arrangement 13. Similarly to the first exemplary embodiment, the direction of the cooling fluid flow can be reversed in this exemplary embodiment as well.

FIG. 6 shows a schematic sketch of an exemplary embodiment of a vehicle 71 in the form of an electric vehicle or a hybrid vehicle, comprising an electric machine 72, which is designed to drive the vehicle 71. The electric machine 72 comprises a stator 73 and, mounted rotatably therein, a rotor assembly 1 according to one of the previously described exemplary embodiments. A coolant circuit comprising the cooling channel arrangement 13 is closed by means of a cooling device 74, which comprises a conveying means and a heat exchanger.

The invention claimed is:

1. A rotor assembly for an electric machine, comprising;
a rotor core, and a shaft which is connected to the rotor core for conjoint rotation,
a cooling channel arrangement formed within the rotor core and the shaft, and having a first cooling channel, which extends within the shaft,
a separation element disposed in the shaft and having a separation portion extending in a circumferential direction at an inner radius of the shaft, wherein the separation portion separates an interior of the shaft into a first shaft portion, in which the first cooling channel extends to supply cooling fluid, and into a second shaft portion, and a sealing means, which seals off the shaft portions with respect to one another, and
a termination element arranged at a free end opposite the first shaft portion, and having a passage to guide the cooling fluid out from the second shaft portion, and another sealing means which seals off the termination element and the shaft with respect to one another.

2. The rotor assembly according to claim 1, wherein the sealing means is an O-ring.

3. The rotor assembly according to claim 1, wherein the separation element further comprises an end portion, which is arranged protruding into the interior of the shaft at a free end, wherein at least one further sealing means is provided, which seals off the end portion and the shaft with respect to one another.

4. The rotor assembly according to claim 3, wherein the at least one further sealing means is an O-ring and/or an adhesive layer arranged on a surface of the end portion, which surface is roughened.

5. The rotor assembly according to claim 1, wherein the cooling channel arrangement extends through the rotor core into the second shaft portion.

6. The rotor assembly according to claim 1, further comprising an end plate arranged on an end face of the rotor core and at least partially forming a second cooling channel of the cooling channel arrangement, which adjoins the first cooling channel.

7. The rotor assembly according to claim 6, wherein a third cooling channel of the cooling channel arrangement adjoins the second cooling channel and extends through the rotor core.

8. The rotor assembly according to claim 7, wherein a fourth cooling channel of the cooling channel arrangement adjoins the third cooling channel and is formed at least in part by a further end plate arranged on the rotor core and leads into the second shaft portion.

9. The rotor assembly according to claim 6, wherein the end plate is sealed off with respect to the rotor core by means of a further sealing means.

10. The rotor assembly according to claim 9, wherein the further sealing means is an O-ring.

11. The rotor assembly according to claim 6, wherein the end plate is sealed off with respect to the shaft by means of a further sealing means (54, 55).

12. The rotor assembly according to claim 1, wherein a lamination stack of the rotor core comprises an outer sealing layer or a plurality of outer sealing layers formed one on the other, made of a resin material.

13. An electric machine, comprising a stator and the rotor assembly according to claim 1 arranged within the stator.

14. A vehicle, comprising the electric machine according to claim 13 which is designed to drive the vehicle.

15. The rotor assembly according to claim 1, wherein the shaft penetrates through the rotor core, the separation element extends from one end of the shaft to supply the cooling fluid to the rotor core, and the termination element is attached to the free end of the shaft arranged outside the rotor core and connected to a further feed element to discharge the cooling fluid from the rotor assembly.

16. A rotor assembly for an electric machine, comprising:
a rotor core, and a shaft which is connected to the rotor core for conjoint rotation,
a cooling channel arrangement formed within the rotor core and the shaft, and having a through hole extending throughout the shaft with a first cooling channel, which extends within the shaft,
a separation element disposed in the shaft and having a separation portion extending in a circumferential direction at an inner radius of the shaft, wherein the separation portion separates an interior of the shaft into a first shaft portion, in which the first cooling channel extends to supply cooling fluid, and into a second shaft portion, and a sealing means, which seals off the shaft portions with respect to one another, and
a termination element which seals off the second shaft portion fluid-tight at a free end opposite the first shaft portion, and having another sealing means which seals off the termination element and the shaft with respect to one another.

* * * * *